United States Patent

Guerro

[11] Patent Number: 5,807,496
[45] Date of Patent: Sep. 15, 1998

[54] COMPOSITIONS COMPRISING POLYAMINE AND MELAMINEALDEHYDE

[75] Inventor: Gerald Guerro, Trumball, Conn.

[73] Assignee: Cytec Technology Corp., Wilmington, Del.

[21] Appl. No.: 724,264

[22] Filed: Sep. 19, 1996

Related U.S. Application Data

[63] Continuation of Ser. No. 332,220, Oct. 31, 1994, abandoned.

[51] Int. Cl.$^6$ ............................................. C02F 5/10
[52] U.S. Cl. ........................... 252/175; 252/180; 210/725; 210/728
[58] Field of Search .................................. 252/175, 180; 210/725, 728

[56] References Cited

U.S. PATENT DOCUMENTS

| | | | |
|---|---|---|---|
| 2,609,307 | 9/1952 | Fluck et al. | 117/141 |
| 2,862,901 | 12/1958 | Suen et al. | 260/29.4 |
| 3,894,944 | 7/1975 | Panzer et al. | 210/54 |
| 3,894,945 | 7/1975 | Panzer et al. | 210/54 |
| 3,894,946 | 7/1975 | Panzer et al. | 210/54 |
| 3,894,947 | 7/1975 | Panzer et al. | 210/54 |
| 4,307,201 | 12/1981 | Won et al. | 521/64 |
| 4,746,457 | 5/1988 | Hassick et al. | 252/181 |
| 4,786,364 | 11/1988 | Tefft | 162/5 |
| 4,880,498 | 11/1989 | Moore et al. | 162/164 |
| 4,913,825 | 4/1990 | Mitchell | 210/705 |
| 5,002,999 | 3/1991 | Watnabe et al. | 210/430 |
| 5,013,456 | 5/1991 | St. John et al. | 210/734 |
| 5,207,924 | 5/1993 | Reed et al. | 210/734 |
| 5,209,854 | 5/1993 | Reed et al. | 210/734 |
| 5,240,509 | 8/1993 | Rey et al. | 134/38 |
| 5,286,390 | 2/1994 | Gray et al. | 210/727 |
| 5,330,656 | 7/1994 | Hassick | 210/708 |

FOREIGN PATENT DOCUMENTS

| | | | |
|---|---|---|---|
| 2003406 | 11/1989 | Canada. | |
| 2003407 | 11/1989 | Canada. | |
| 0 529 865 A1 | 8/1992 | European Pat. Off. | C02F 1/52 |
| A-493987 | 8/1992 | European Pat. Off. | C02F 1/72 |
| WO 93/02966 | 2/1993 | WIPO | C02F 9/00 |
| WO 93/02967 | 2/1993 | WIPO | C02F 9/00 |

OTHER PUBLICATIONS

*Coagulation of Organic Wastewater,* Waste Treatment vol. 100, 1984 Kurita Water Industries, Ltd. Jpn. Kokai Tokkyo Khoho JP 58,216,777 [83,216,777] Chemical Abstracts, vol. 100:161 434 t.

*Coagulation of Organic Wastewater,* Kurita Water Industries, Ltd. Jpn. Kokai Tokkyo Koho JP 59,177,190 Chemical Abstracts, vol. 102:50489 Date unknown.

*Primary Examiner*—Sharon Gibson
*Assistant Examiner*—Cephia D. Toomer
*Attorney, Agent, or Firm*—Margaret M. Coyne; Joseph J. Mallon; Claire M. Schultz

[57] ABSTRACT

Compositions comprising polyamine and melamine polymers in certain ratios are provided for coagulating suspended solids in wastewaters such as deinking process waters and raw waters.

4 Claims, No Drawings

COMPOSITIONS COMPRISING POLYAMINE AND MELAMINEALDEHYDE

This is a continuation of abandoned application Ser. No. 08/322,220, filed Oct. 31, 1994 for Methods of Coagulating and Decolorizing Waste Streams.

FIELD OF THE INVENTION

This invention generally relates to the clarification of waste waters or raw waters, more specifically to the coagulation and decolorization of process waters resulting from deinking, pulp and paper mills using melamine-aldehyde polymer combined with polyamine.

BACKGROUND OF THE INVENTION

To recycle used paper, the paper typically goes through a deinking process which initially defibers the paper, e.g., waste newsprint, in an aqueous bath containing a deinking agent and a detergent or other surface active agent in addition to the paper. As the waste newsprint is defibered, the ink is removed from the fibers. Various combinations of washing, flotation and cleaning steps are used to separate the fibers from one another and from the ink and to remove the ink and other materials from the repulped stock. Effluent streams resulting from this process, also called process waters, contain color bodies which generally include inks—both water-based inks such as flexographic ink and oil-based inks such as nonimpact inks and lithographic inks—as well as lignins, lignin degradation products, humic acids and pectins. Color bodies may be found in other types of wastestreams and raw waters such as fresh water bodies.

In clarifying deinking process waters, or other waste waters that contain color bodies it is important to remove the suspended solids therein as well as decolorize the water. Many existing coagulants, however, are not very effective in decolorizing and many decolorizing agents are less effective in coagulating suspended solids. As wastepaper continues to contain greater amounts of water-soluble inks such as flexographic ink, the clarification of process waters that contain color bodies has become more difficult.

Consequently, there exists a need, particularly in the paper recycling industry, for a material that can effectively coagulate suspended solids as well as remove color bodies from waste water particularly color bodies comprising flexographic ink.

Among the various agents used in the art to clarify deinking process waters and other ink-laden wastewaters, polyamines and melamine formaldehyde acid colloid polymers have been taught in the art to be effective.

Macroporous aminotriazinealdehyde resins are described as being useful for treating paper pulp mill effluent. In U.S. Pat. No. 5,286,390 a melamine formaldehyde acid colloid polymer is taught as being useful for separating ink-laden solids and turbidity from deinking process waters. Optionally, an effective amount of flocculant may subsequently be added to assist the solids/liquid separation. However, such acid colloid polymers have been found to be relatively poor coagulants.

Polyamines have been used as coagulants, often in conjunction with a flocculant, in treating waste waters. For example, copolymers of diallyidimethylammonium chloride and anionic monomer, are disclosed in U.S. Pat. No. 5,013,456 and U.S. Pat. No. 5,207,924 as being useful for coagulating suspended solids from deinking process waters. In U.S. Pat. No. 5,209,854 copolymers of diallyldimethylammonium chloride and certain anionic comonomers are taught as being useful to decolorize pulp mill waste waters. See also U.S. Pat. Nos. 4,746,457 and 5,330,656. Polyamines made from epoxy compounds and secondary amines are also taught as being useful for clarifying raw water in U.S. Pat. No. 3,894,944 and U.S. Pat. No. 3,894,945 and for flocculating industrial wastes in U.S. Pat. No. 3,894,947, each of which are incorporated by reference. These polyamines, however, tend to exhibit insufficient efficacy for color removal at normal doses.

Polyamines have been used in conjunction with other clarification aids to treat certain wastewaters. Water soluble polyamine epichlorhydrin polymers, among other cationic polymers, are taught in WO 93/02967 as being useful in combination with an anionic colloidal material for flocculating suspended solids in ink-laden waste waters. EP 529 865 describes methods of decolorizing effluent streams from pulp mill plants using ferrous sulfate and any water-soluble cationic polyamine such as diallyidimethylammonium chloride polymers or polyamines made from epihalohydrin and lower alkyl diamine. Polyamines made from epichlorohydrin have also been used together with a melamine formaldehyde acid colloid polymer to treat wastestreams resulting from paper production and municipal sludge treatment. In such instances, the polyamine and acid colloid polymer were fed separately into the effluent waste stream in a 1:1 or 2:1 ratio on site. But this resulted in less than satisfactory water clarification.

It has now been found that the premixing of a small amount of melamine formaldehyde acid colloid polymer to polyamine made from an epoxy compound and secondary amine enhances the performance of the polyamine with respect to coagulation in removal of solids and turbidity as well as decolorization. The resulting composition remains stable for extended periods of time and may be used for clarifying any wastestreams or raw waters containing suspended solids and preferably for coagulating, more preferably coagulating and decolorizing wastestreams containing color bodies.

Given the chemistry of the polyamine and the sensitivity of the melamine formaldehyde acid colloid polymer to pH concentrations beyond the approximate 1.4 to about 2.2 pH range, it was surprising to find that melamine formaldehyde acid colloid polymer could actually be combined with the polyamine to form a stable composition having improved coagulant performance without destroying the effectiveness of the melamine formaldehyde. The use of a mixture of a melamine formaldehyde acid colloid polymer and a polyamine provides for better coagulation to facilitate separation of suspended solids and color bodies from the water treated than the use of either polymer alone at the same dosage. Since melamine aldehyde polymers are less expensive than polyamines the improved coagulant compositions of the present invention are also economically desirable. In addition, handling and processing advantages are obtained by the ability of using only one feed line for the polyamine/melamine aldehyde acid colloid polymer mixture instead of two separate feed lines for the two polymer components.

SUMMARY OF THE INVENTION

The present invention provides a composition for separating, preferably by coagulation, suspended solids and color bodies in effluent or waste water streams, preferably those resulting from deinking, paper or pulp mill operations. Raw waters containing suspended solids and/or color bodies may also be treated by the compositions herein. The term "coagulant" as used for purposes of this invention primarily refers to agents which cause the agglomeration or precipitation of solids by, for example, charge neutralization (technically known as coagulation) and can also include agents that combine solids into larger agglomerates or "flocs" by, for example, bridging (technically known as flocculation).

According to this invention, there is provided compositions comprising a polyamine and a melamine aldehyde acid colloid polymer in a ratio of about 90.0–99.9 parts by weight polyamine to about 10.0–0.1 parts by weight of acid colloid polymer; wherein the polyamine is a reaction product of a secondary amine and a difunctional epoxy compound or precursor thereof. The compositions of the present invention which comprise polyamine and melamine aldehyde polymer in the amounts specified herein are also called "coagulant compositions" for purposes of this invention. Preferably the compositions of the present invention consist essentially of melamine formaldehyde acid colloid polymer and polyamine.

The present invention also provides a method for separating suspended solids from a wastewater stream or raw water which comprises: (i) adding to said wastewater stream in an amount sufficient to coagulate said solids a composition comprising polyamine and melamine aldehyde acid colloid polymer in a ratio of about 90.0–99.9 parts by weight of polyamine to about 10.0–0.1 parts by weight of acid colloid polymer; wherein said polyamine is a reaction product of a secondary amine and a difunctional epoxy compound or precursor thereof; and (ii) separating said solids from said wastewater stream or raw water. Preferably the ratio of polyamine to acid colloid polymer ranges from about 96.5 to about 99.9 parts by weight polyamine to about 3.5–0.1 parts by weight acid colloid polymer.

In another embodiment of this invention there is provided a method for separating suspended solids and color bodies from deinking process waters resulting from the processing of recycle paper which comprises: (i) adding to said process water from about 0.5 to about 150 parts per million, based on said process water, of a composition comprising a polyamine and a melamine formaldehyde acid colloid polymer in a ratio of about 96.5–99.9 parts by weight of polyamine to about 3.5–0.1 parts by weight of acid colloid polymer; wherein said polyamine is a reaction product of a secondary amine and a difunctional epoxy compound or precursor thereof; and (ii) separating said solids and said color bodies from said process water.

DETAILED DESCRIPTION OF THE INVENTION

The polyamines used in the instant invention are those formed by the reaction of difunctional epoxy compounds with lower alkyl secondary amines. These polyamines are well known in the art and disclosed in, for example, U.S. Pat. No. 3,894,944; U.S. Pat. No. 3,894,945; U.S. Pat. No. 3,894,946; U.S. Pat. No. 3,894,947; and U.S. Pat. No. 3,894,947 each disclosure of which are incorporated by reference. The difunctional epoxy compounds used to make the polyamines are usually halohydrins such as epihalohydrins and precursors of epihalohydrins which are converted into corresponding epoxy compounds under alkaline conditions. Epichlorohydrin is preferred. Typical secondary amines used to prepare the polyamines used in the present invention include those containing alkyl groups having 1 to 3 carbon atoms; dimethylamines are preferred.

The molecular weight of the polyamines used in the present invention is not critical. Usually, the molecular weight ranges from about 25,000 to about 1 million, preferably 50,000 to 250,000. Commercial polyamine products are typically diluted with water to form an aqueous solution of polyamine. The concentration of polyamine in these solutions is not critical, though it preferably ranges from about 25 to about 50 weight percent polyamine. The pH of these polyamine solutions may range anywhere form about 5 to about 7.

Suitable melamine aldehyde acid colloid polymers, also called "melamine aldehyde polymers" or "acid colloid polymers" (or MFAC) herein unless the context dictates otherwise, include any polymer prepared from the following two components: 1) a melamine or substituted melamine, and 2) a compound having the following general formula:

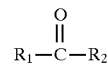

wherein $R_1$ and $R_2$ are selected from the group consisting of H and straight or branched alkyl groups having from 1–4 carbons and wherein $R_1$ and $R_2$ may be the same or different. As to the first component, suitable substituted melamine are known in the art or can be ascertained by one skilled in the art through routine experimentation; preferred substituted melamines include trimethylolmelamine, N-guanylmelamine, N-phenylmelamine, N-benzylmelamine and benzoguanamine. With respect to the second component, aldehydes such as formaldehyde, acetaldehyde, and propionaldehyde, trioxane, paraformaldehyde and mixtures thereof and the like are preferred with formaldehyde as most preferred. The mole ratio of the first component (melamine) to second component preferably ranges from about 1:1 to about 1:6, more preferably from about 1:2 to about 1:4, most preferably about 1:3 to about 1:4. The most preferred melamine aldehyde polymer is prepared from about 1 mole of melamine or derivative thereof to about 3 to about 4 moles of formaldehyde. The melamine aldehyde polymers used in the present invention are well known to those skilled in the art and are described in, for example, U.S. Pat. No. 2,609,307 which is incorporated herein by reference. 25 Since the melamine aldehyde polymer tends to be insoluble in water it usually exists Since the malamine aldehyde polymer tends to be insoluble in water it usually exists in the form of an acid colloid polymer which means that the melamine aldehyde polymer is maintained in acidic aqueous solution, generally a colloidal suspension, which typically contains anywhere from about 0.1 to about 20 weight percent melamine aldehyde, preferably about 1 to about 15 weight percent and most preferably about 4 to about 12 weight percent melamine aldehyde; acid is present in amounts sufficient to maintain a low pH such that the melamine aldehyde polymer will remain as a colloidal suspension and not precipitate. Preferably the pH of the colloidal suspension of melamine aldehyde polymer ranges from about 1.4 to about 2.2, more preferably from about 1.6 to about 1.8. A broad range of acids may be used to prepare the melamine aldehyde acid colloid such as, for example, acetic, hydrochloric, phosphoric, formic, propionic; hydrochloric acid is most preferred. Stabilizing agents known in the art such as alcohols, e.g. methanol, may also be included in the acid colloid polymer.

The molecular weight of the melamine aldehyde acid colloid polymer is not critical. Preferred molecular weight ranges from about 500 to about 200,000, more preferably from about 75,000 to about 175,000. Suitable melamine aldehyde acid colloid polymers (MFAC) are known in the art and commercially available, for example, from Cytec Industries Inc. under the trademark PARAMEL®.

In preparing the coagulant compositions of the present invention, it is preferred to add the MFAC to the polyamine and not polyamine to the melamine aldehyde polymer. The ratio of polyamine to MFAC is important and usually ranges from about 90.0–99.9 parts by weight polyamine to about 10–0.1 parts by weight MFAC preferably from about 93.0–99.1 parts by weight polyamine to about 7.0–0.1 parts by weight MFAC, more preferably from about 96.5–99.9 parts by weight polyamine to about 3.5–0.1 parts by weight MFAC and most preferably from about 98.0–99.9 parts by weight polyamine to about 2.0–0.1 parts by weight MFAC. A most preferred range also includes about 98.04–99.64 parts by weight polyamine to about 1.96–0.36 parts by weight MFAC. Thus the amount of MFAC in the coagulant composition is usually at least 0.1 parts, preferably at least 0.2 parts, more preferably at least 0.36 parts. The melamine aldehyde polymers are mixed into the polyamine or polyamine aqueous solution with mild agitation, usually for 15–20 minutes. Additional materials may be added to the coagulant composition as long as the materials do not inhibit the coagulation performance of the composition. Such additional materials include, for example, alcohols, glycols and mixtures thereof and the like.

The compositions of the present invention may be added to the water being treated by any conventional method. Preferably the coagulant composition is added to the wastestream or raw water being treated in a feed water line. The addition of an effective amount of coagulant composition generally causes formation of distinct flocs by coagulation.

Any type of wastestream or raw water that contains suspended solids may be treated by the compositions of the present invention, generally wastestreams such as sludge, preferably any wastestream or raw water that contains color bodies and suspended solids, more preferably pulp and paper mill wastestreams, most preferably wastestreams resulting from deinking processes.

It is recognized in the art that the nature of suspended solids and color bodies in wastestreams and raw waters will vary depending upon their point of origin, their course of travel, the commingling of other waters therewith and the discharge of treated wastes therein. The ultimate uses for the wastestreams and raw waters can also vary, for example, from recycled usage for industrial purpose, i.e., in paper and deinking plants, to uses suitable for bathing and for drinking. These variations in suspended solids content and usage often dictate different desired degrees of clarification. Accordingly, the desired dosage of coagulant composition will vary depending on the particular wastestream or raw water being treated, given the variables mentioned above. Consequently, the amount of coagulant composition to be used should generally be an amount sufficient to coagulate the suspended solids in the wastestream or raw water being treated, preferably an amount sufficient to coagulate the suspended solids and color bodies therein to facilitate the separation of suspended solids and color bodies from the water treated. This can be readily determined by one skilled in the art by routine experimentation. Typically, coagulant composition dosage may range from about 0.5 to about 150 parts per million, based on the wastewater or raw water treated, preferably from about 7.5 to about 50 parts per million. For treating deinking process waters the dosage usually ranges from about 5 to about 150 parts per million, based on the process water treated, preferably from about 1 to about 100 parts per million. For treating process waters resulting from paper or pulp mills the dosage usually ranges from about 1 to about 20 parts per million, based on the process water treated.

After the addition of the coagulant composition, the coagulated solids and color bodies are separated from the wastestream or raw water being treated by any conventional solid/liquid separation means, such as clarifiers, dissolved air flotation or settling clarifiers. Optionally, a flocculant, i.e., agent that combines solids into larger agglomerates or flocs, may be added in an amount sufficient to flocculate the agglomerated solids and thereby further facilitate the solid/liquid separation. The type of flocculant is not critical to the instant invention and suitable flocculants include conventional anionic, cationic, nonionic and amphoteric polymers, mixtures thereof and the like. It is preferred to use an anionic flocculant, especially in treating deinking process waters and paper and pulp waste waters. Preferred anionic polymer flocculant includes those made from the following monomers: acrylic acid, methacrylic acid, ethacrylic acid and their alkali metal or ammonium salts, vinyl sulfonic acid, 2-acrylamido-2-alkylsulfonic acids and 2-acrylamido-2-alkylsulfonates where the alkyl group contains 1 to 6 carbon atoms, such as acrylamido 2-methyl propanesulfonic acid or mixtures of any of the foregoing and their alkali metal or ammonium salts. Hydrolyzed acrylamide may also be used. The anionic monomers may be copolymerized with (alk) acrylamide, preferably acrylamide or methacrylamide. Preferred cationic polymer flocculants include those prepared from the following monomers: dialkylaminoalkyl (meth) acrylates and dialkylaminoalkyl (meth) acrylamides, including their acid addition or quaternary ammonium salts, diallyl dialkyl ammonium halides, vinyl benzyltrialkyl ammonium salts, and the like. Quatemized Mannich or dialkyl amino methylated (alk)acrylamide polymers such as quaternary N-trimethylaminomethylacrylamide prepared by functionalizing (alk)acrylamide or poly(alk)acrylamide may be particularly preferred for certain applications. Specific examples of preferred cationic monomers include, N-dimethylaminomethyl acrylamide; acryloxyethyltrimethylammonium chloride; methacryloxyethyltrimethylammonium chloride; 2-methacryloyloxyethyl trimethyl ammonium methosulfate, 2-methacryloyloxyethyl trimethyl ammonium chloride; diallydimethylammonium chloride; 3-acrylamido-3-methyl butyl trimethyl ammonium chloride, 2-acrylamido-2-methylpropyltrimethylammonium chloride, 3-methacryloyl-2-hydroxypropyltrimethylammonium chloride, dimethylaminoethylacrylate, dimethylaminoethylmethacrylate or mixtures of any of the foregoing. Mixtures of any of the above cationic monomers together with (meth) acrylamide are also useful.

Preferred nonionic polymer flocculants include those prepared from the following monomers: acrylamide; methacrylamide; dialkylaminoethyl acrylamides; N,N-dialkylacrylamides; N-alkylacrylamides; N-vinylacetamide; N-vinyl formamide; N-vinyl pyrrolidone and mixtures thereof. Especially preferred is acrylamide and methacrylamide.

The preferred amphoteric polymers for use in the present invention comprise copolymers of one or more of the foregoing anionic monomers and one or more of the cationic ethylenically unsaturated monomers listed above or monomers which contain both anionic and cationic functionalities. Representative examples of suitable polyampholytes include polymers comprising i) acrylic acid, methacrylic acid, 2-acrylamido-2-methyl-propylsulfonic acid or 2-methacrylamido-2-methylpropylsulfonic acid, alone or in combination, and ii) dimethyldiallyl ammonium chloride, dimethyldiallylammonium bromide, diethyldiallylammonium chloride or diethyidialylammonium bromide, alone or in combination, wherein the weight ratio of component i) to component ii) ranges from about 90:10 to about 10:90. The polyampholytes may also contain nonionic moieties such as acrylamide or methacrylamide.

The most preferred flocculants to be used with the compositions of the instant invention are anionic polymers, preferably anionic polymers that contain from about 2 to about 50 mole percent anionic functionality, based on monomer, more preferably from about 10 to about 40 mole percent anionic functionality, based on monomer. Such anionic polymers preferably have a molecular weight of at least about 16 million, more preferably at least about 30 million.

The most preferred anionic flocculants which may be used in the present invention include hydrolyzed polyacrylamide, acrylamide/acrylic acid copolymers, acrylamide/acrylate copolymers, polyacrylates and acrylamide/acrylamido methylpropane sulfonic acid copolymers. The preferred amounts of polymer flocculant may vary depending on the water being treated and the coagulant composition dosage. In this sense, optimal flocculant dosage may be readily determined by one skilled in the art by routine experimentation. For process waters resulting from a deinking process waters, for example, flocculant dosages ranging from about 1 to about 125 ppm, based on the process water, may be preferred.

After addition of the polymer flocculant to the wastewater or raw water the suspended solids and color bodies may be removed by any conventional means known in the art, such as, for example clarifiers, settling tank.

It is believed that one skilled in the art can use the preceding description to utilize the present invention to its fullest extent.

DESCRIPTION OF PREFERRED EMBODIMENTS

EXAMPLE 1

The following examples are set forth for illustration purposes only and are not to be construed as limitations on the present invention as set forth in the appended claims.

Graduated cylinders were filled with 250ml of untreated process water collected from an alkaline clarifier in an old newsprint/old magazine deinking plant. The coagulant composition used was prepared by adding 0.5 g of a melamine formaldehyde acid colloid (MFAC) (9% by weight active; pH about 1.8) to 25 g of polyamine (50% by weight active). The polyamine was made from epichlorohydrin and dimethylamine and had a molecular weight of about 75,000. The MFAC had a molecular weight of about 175,000. The coagulant composition comprised polyamine and MFAC in a ratio of 98.04 parts by weight polyamine to 1.96 parts by weight MFAC. To the process water was added an amount of coagulant composition to deliver 50ppm polymer (real) based on the process water. The cylinder was then inverted six times to ensure adequate mixing and initiate coagulation. A hydrolyzed polyacrylamide flocculant (molecular weight of about 32 million) containing about 40 mole percent anionic functionality, based on monomer, was subsequently added at a dosage of 3.8 ppm polymer, based on the process water, to facilitate liquid/solid separation. After adding the flocculant, the cylinder was inverted twice to commence the flocculation process. Floc size, stability, and the rate of liquid/solid separations were evaluated. A portion of the resulting filtrate was removed and the following parameters were measured: turbidity (NTU), color (L*a*) as measured by the CIELAB color space system and percentage total suspended solids (% TSS) removed. The results are presented in TABLE 1.

EXAMPLE 2

The procedure used in Example 1 was followed except that the coagulant composition was prepared by adding 0.09g of MFAC (9 weight % active; pH about 1.8) to 25g of polyamine (50% by weight active). The ratio of polyamine to MFAC in the composition was 99.64 parts by weight polyamine to 0.36 parts by weight MFAC. The results for filtrate turbidity, floc stability, color measurements and total suspended solids removed appear in TABLE 1.

EXAMPLE 3

The procedure in Example 1 was followed except that the coagulant composition was prepared by adding 0.09 g of MFAC (9% by weight active; pH about 1.8) to 10 g polyamine (50% by weight active). The ratio of polyamine to MFAC in the composition was 99.14 parts by weight polyamine to 0.89 parts by weight MFAC. The results are listed in TABLE 1.

EXAMPLES 4–6

The tests in Examples 4–6 were performed as controls and do not represent the invention. For Example 4, the procedure used in Example 1 was followed except that no coagulant and no flocculant was added.

In Example 5 the procedure used in Example 1 was followed except that 50 ppm of polyamine was added to the process water, based on the process water. Subsequently 3.8ppm of the anionic flocculant used in Example 1 was also added with agitation. The results are listed in TABLE 1.

In Example 6 the procedure used in Example 1 was followed except that 50 ppm of MFAC, based on the process water, was added to the process water. Subsequently 3.8ppm of the anionic flocculant used in Example 1 was added. The results appear in TABLE 1.

The results in Table 1 demonstrate that the addition of certain small amounts of MFAC to an epichlorohydrin polyamine improves color removal and the coagulation performance of the polyamine, providing better filtrate quality, floc stability and total suspended solids removal. The compositions comprising polyamine and MFAC in a general ratio of about 97.5 to about 99.9 parts polyamine to about 2.5 to about 0.1 MFAC, preferably 98.04 to about 99.64 parts polyamine to about 1.96 to about 0.36 parts MFAC as shown in Table 1 above provide superior performance with respect to coagulation and color removal as compared to the use of a polyamine or an MFAC alone at the same dosage.

TABLE 1

| Example | Active Polymer Dosage ppm | Filtrate Turbidity (NTU) | Floc Stability 1 = Best, 5 = Worst | Color Reading L* | a* | % TSS Removed |
|---|---|---|---|---|---|---|
| 1 | 50 | 74 | 1 | 62.19 | 0.42 | 99.5 |
| 2 | 50 | 50 | 1 | 62.92 | 0.21 | 99.5 |
| 3 | 50 | 56 | 1 | 62.72 | 0.31 | 99.6 |
| 4** | 0 | >2000 | 5 | 57.02 | 1.6 | 0 |
| 5** | 50 | 185 | 2 | 57.70 | 1.16 | 98.1 |
| 6** | 50 | >2000 | 5 | — | — | — | color designations
a* denotes red
L* denotes Black/White where 0 = Black 100 = White
**not representative of the invention

TABLE II

| Example | Ratio MFAC: Polyamine in Composition | Coagulant Dosage[1] | Filtrate Turbidity NTU |
|---|---|---|---|
| 7** | Blank | 0 | >2000 |
| 8 | 1.96 parts MFAC 98.04 parts Polyamine | 50 | 301 |
| 9 | 0.36 parts MFAC 99.64 parts Polyamine | 50 | 390 |
| 10 | 0.89 parts MFAC 99.11 parts Polyamine | 50 | 360 |
| 11 | 3.47 parts MFAC 96.53 parts Polyamine | 50 | 371 |
| 12** | 100 parts MFAC | 50 | >2000 |

**not representative of the invention
[1]ppm, based on process water

EXAMPLES 7–12

For Examples 7–12 the procedure in Example 1 was used to treat a process water from a paper deinking mill using compositions containing polyamine (molecular weight 50,000) and MFAC (9% active, pH about 1.8, molecular weight about 175,000) in various ratios as set forth in Table II, except that 3.9 ppm of 30 mole percent hydrolyzed polyacrylamide was used as the flocculant.

EXAMPLES 13–19

Compositions containing polyamine (molecular weight about 75,000) and MFAC (molecular weight about 175,000) in various ratios were prepared and their physical appearance was observed and set forth in Table Ill. The observations indicate that levels of MFAC generally greater than 30 parts, preferably greater than 10 parts decreases stability and clarity of coagulant compositions.

TABLE III

| Example | Composition | Wt Ratio Polyamine to MFAC | Physical Appearance |
|---|---|---|---|
| 13 | Polyamine | 100 | Amber, transparent |
| 14 | MFAC | 100 | Clear, transparent |
| 15 | Polyamine MFAC | 95 5 | Amber, transparent, Slight Precipitate |
| 16 | Polyamine MFAC | 90 10 | Amber, translucent, precipitate |
| 17 | Polyamine MFAC | 70 30 | White, opaque |
| 18 | Polyamine MFAC | 50 50 | White, opaque |
| 19 | Polyamine MFAC | 40 60 | White, opaque |

EXAMPLES 20–28

The procedure in Example 1 was used to treat a process water from a paper deinking mill (70% old newsprint/ 30% old magazine) using compositions containing polyamine (molecular weight 75,000, 50% active) and MFAC (9% active) in various ratios as set forth in Table IV. On this particular process water the optimal ratio appears to be about 1.96% MFAC to 98.04% polyamine, based on real solids. Improved performance was generally obtained from using compositions containing from about 0.1–10.0% by weight MFAC to 99.9%–90.0 by weight polyamine.

TABLE IV

| Example | Ratio MFAC Polyamine in Composition | Coagulant Dosage[1] | Filtrate Turbidity NTU |
|---|---|---|---|
| 20 | 100 parts Polyamine | 50 | 280 |
| 21 | 0.1 parts MFAC 99.9 parts Polyamine | 50 | 244 |
| 22 | 0.36 parts MFAC 99.64 parts Polyamine | 50 | 241 |
| 23 | 1.96 parts MFAC 98.04 parts Polyamine | 50 | 211 |
| 24 | 3.5 parts MFAC 96.5 parts Polyamine | 50 | 369 |
| 25 | 10 parts MFAC 90 parts Polyamine | 50 | 353 |
| 26 | 37.5 parts MFAC 62.5 parts Polyamine | 50 | >2000 |
| 27 | 50 parts MFAC 50 parts Polyamine | 50 | >2000 |
| 28 | 100 parts MFAC | 50 | >2000 |

[1]ppm active solids based on process water

I claim:

1. A composition comprising a polyamine and a melamine aldehyde acid colloid polymer in a ratio of about 90.0–99.9 parts by weight polyamine to about 10.0–0.1 parts by weight of acid colloid polymer; wherein said polyamine has a molecular weight ranging from about 25,000 to about 1 million and is a reaction product of a secondary amine and a difunctional epoxy compound or precursor thereof; wherein said melamine aldehyde acid colloid polymer has a molecular weight ranging from about 500 to about 200,000.

2. A composition according to claim 1 wherein the ratio of said polyamine to said acid colloid polymer ranges from about 96.5–99.1 parts by weight polyamine to about 3.5–0.1 parts by weight acid colloid polymer.

3. A composition according to claim 1 wherein said polyamine has a molecular weight ranging from about 50,000 to about 1 million.

4. A composition according to claim 1 wherein said polyamine is a reaction product of a dimethylamine and an epihalohydrin or precursor for epihalohydrin.

* * * * *